DIRECTION OF GAS FLOW

Sept. 2, 1969   T. J. HIRT ET AL   3,465,115
METHOD AND APPARATUS FOR HEATING GASES TO HIGH TEMPERATURES
Filed April 10, 1968   6 Sheets-Sheet 3

INVENTORS.
Thomas J. Hirt
Chester W. Marynowski
BY Merriam, Marshall, Shapiro, & Klose
ATTORNEYS

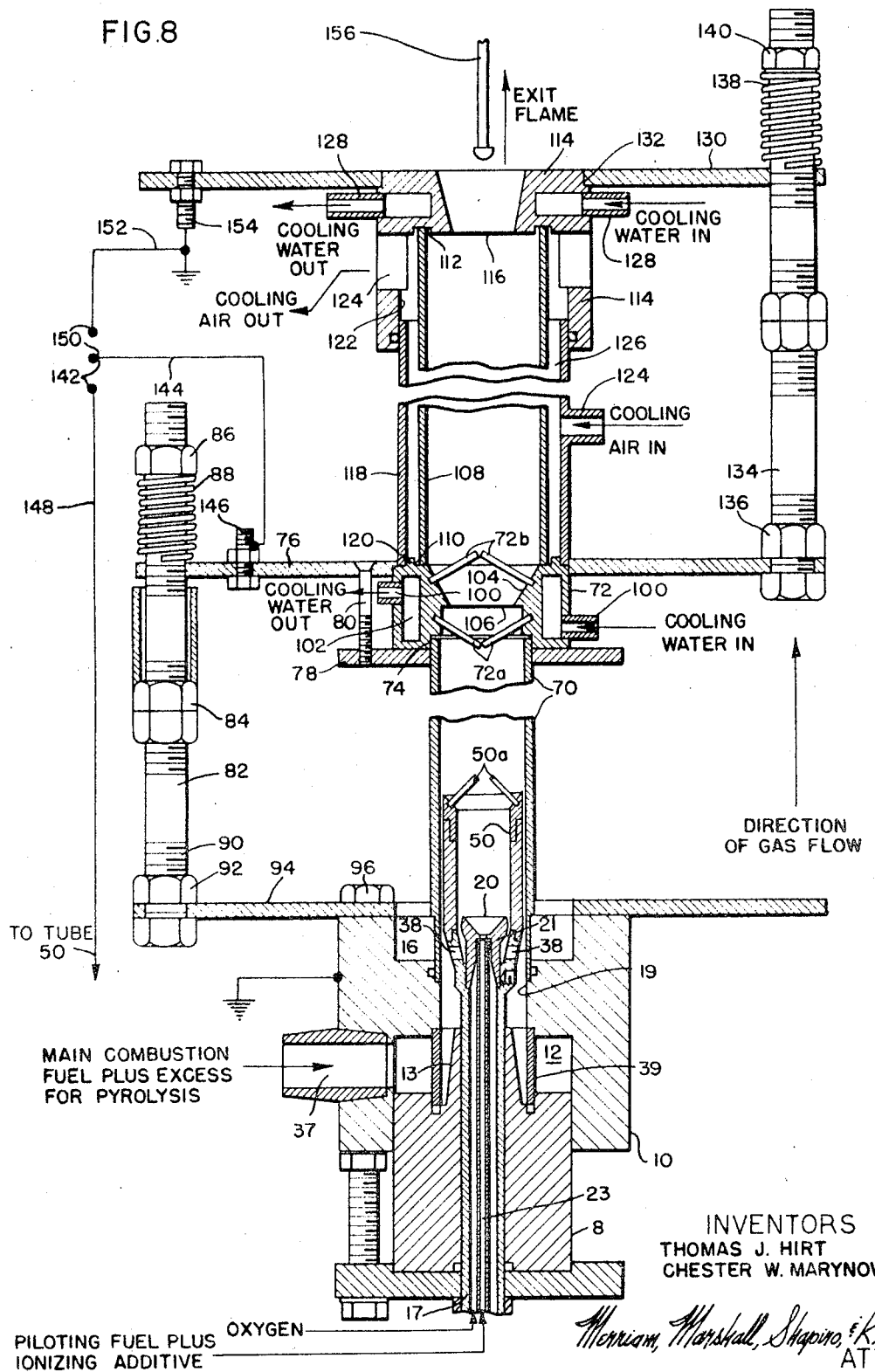

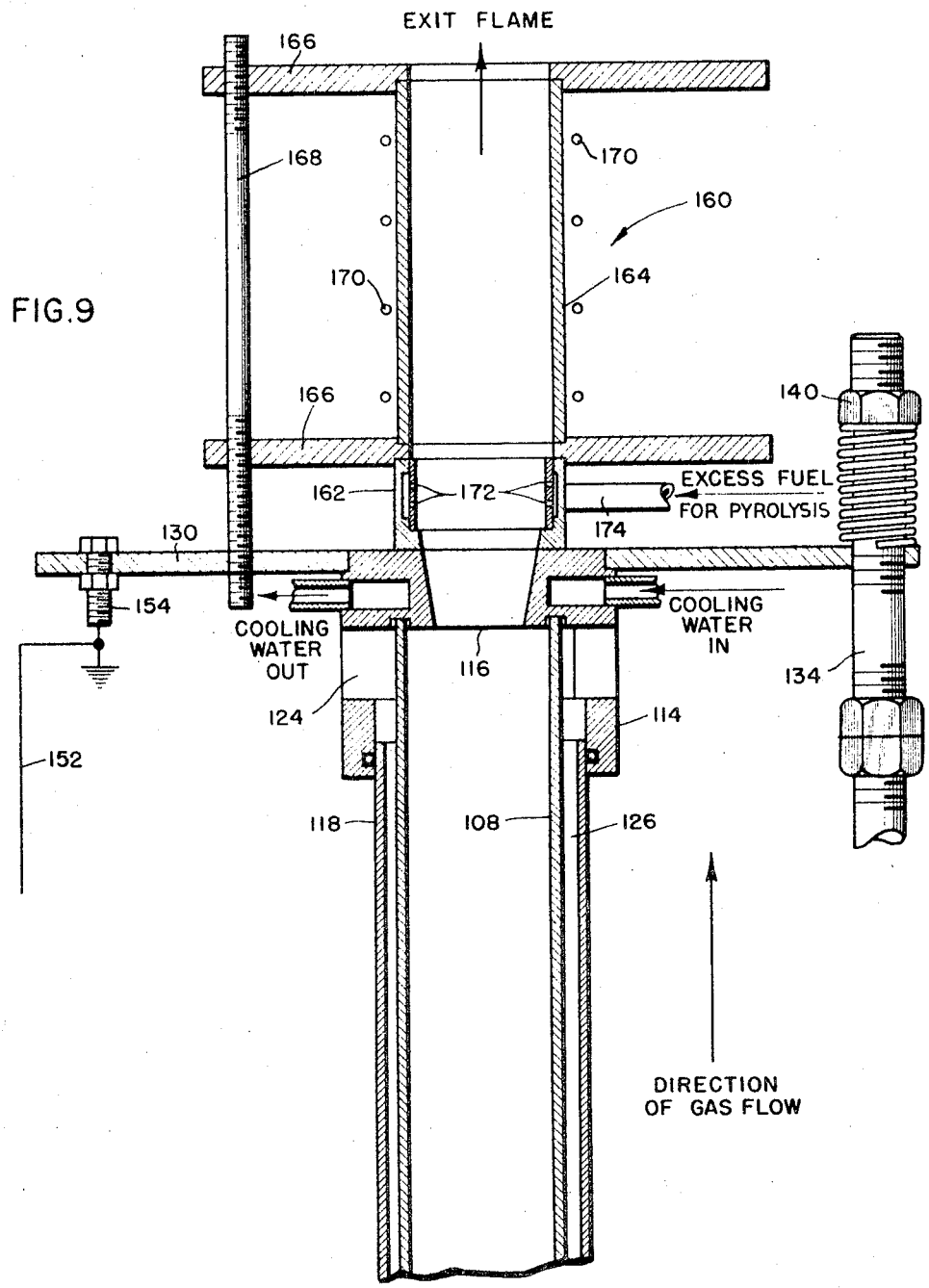

Sept. 2, 1969  T. J. HIRT ET AL  3,465,115
METHOD AND APPARATUS FOR HEATING GASES TO HIGH TEMPERATURES
Filed April 10, 1968  6 Sheets-Sheet 6
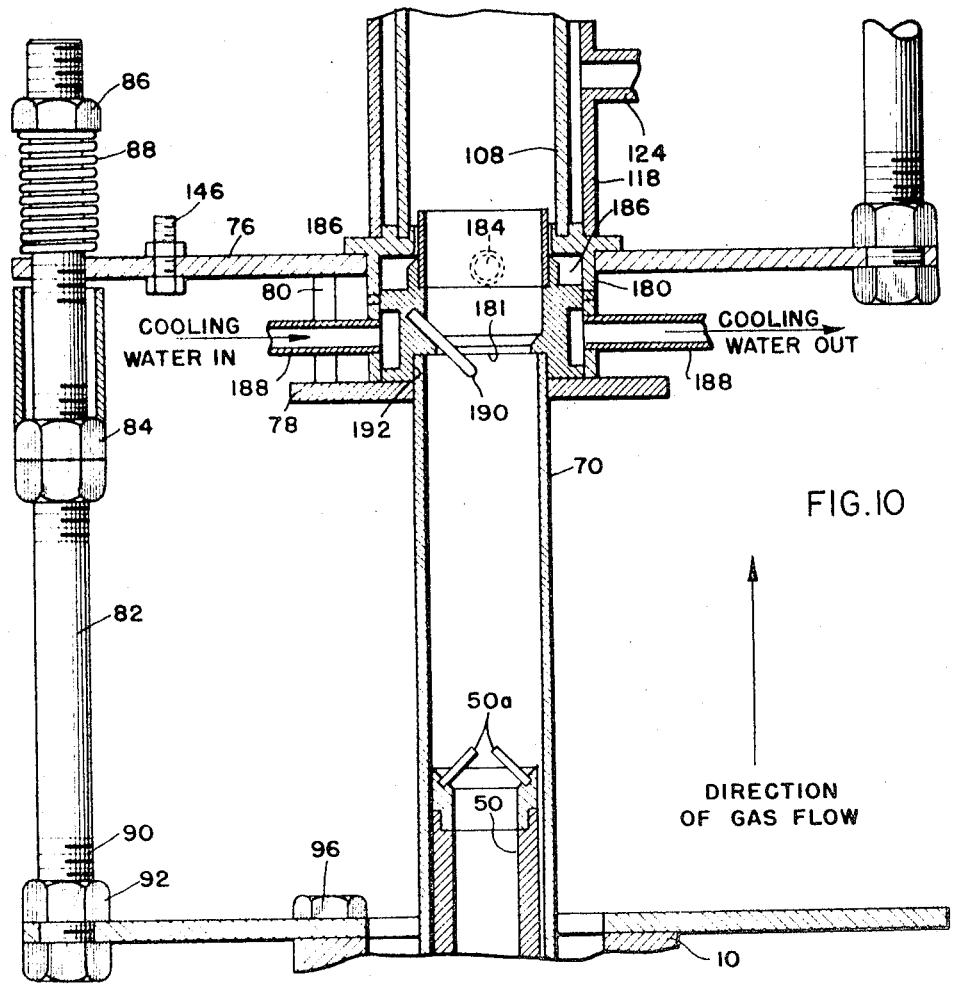
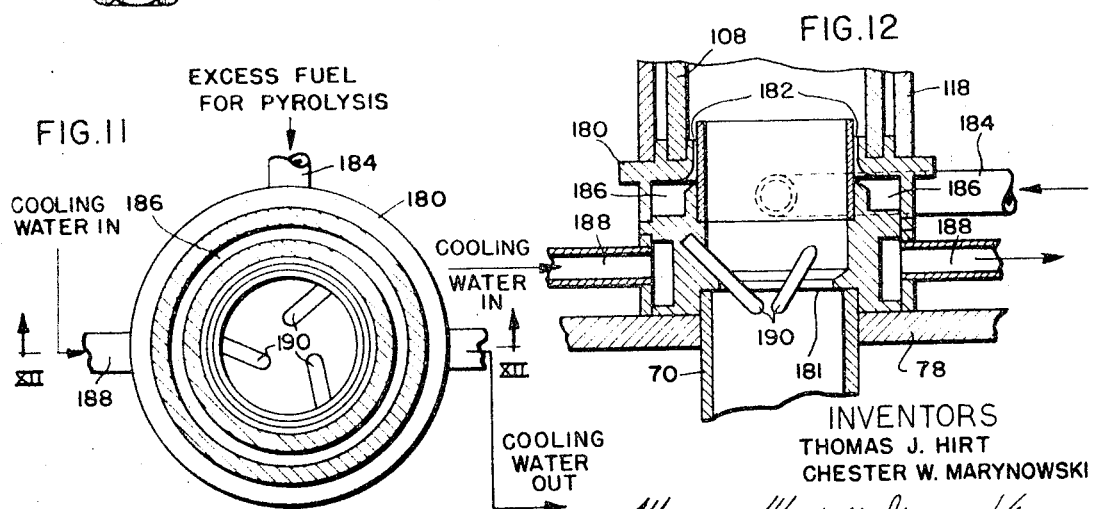
INVENTORS
THOMAS J. HIRT
CHESTER W. MARYNOWSKI
Merriam, Marshall, Shapiro & Klose
ATTYS.

United States Patent Office 3,465,115
Patented Sept. 2, 1969

3,465,115
METHOD AND APPARATUS FOR HEATING GASES TO HIGH TEMPERATURES
Thomas J. Hirt, Omaha, Nebr., and Chester W. Marynowski, Mountain View, Calif., assignors to Northern Natural Gas Company, Omaha, Nebr., a corporation of Nebraska
Continuation-in-part of application Ser. No. 429,756, Feb. 2, 1965. This application Apr. 10, 1968, Ser. No. 720,070
Int. Cl. B23k 9/16, 35/38
U.S. Cl. 219—75        26 Claims

ABSTRACT OF THE DISCLOSURE

A method and apparatus for heating gases to high temperatures in which a first combustible mixture and ionizing additives are ignited to form a pilot flame, a second combustible mixture is supplied to the pilot flame and ignited, an electrical discharge is maintained through the combusting gases and products of combustion of the two ignited combustible mixtures, a uniformly distributed electrical discharge is maintained through the products of combustion resulting from the first electrical discharge, and there is optionally provided a thermally promoted chemical reaction such as introducing methane in the apparatus for acetylene synthesis.

---

This is a continuation-in-part of our earlier copending application U.S. Ser. No. 429,756, filed Feb. 2, 1965 now abandoned.

In U.S. Patent No. 3,004,137, there is described an electrically augmented flame in which an electrical discharge is distributed throughout a flame created by chemical combustion and thereby heat derived from electrical energy is added to the heat produced by the chemical combustion. The electrical discharge employs a high voltage and a low current as contrasted to an electric arc which employs a low voltage and a high current and which is concentrated into a narrow filament between two electrodes.

Such an electrically augmented flame produces useful results. For example, electrical power supply problems are reduced because large amounts of power can be supplied at conveniently high voltages. Since relatively low currents are employed, construction and maintenance of electrodes are greatly simplified; further, a substantially uniform temperature is maintained throughout the entire flame. Most important, temperatures can be obtained with ordinary fuels which otherwise could be obtained only with high cost fuels such as acetylene, cyanogen, etc.

The term "distributed discharge" denotes a type of high power electrical discharge which employs a high voltage and low current, as contrasted to the electric arc which employs a low voltage and high current and which tends to contract into a narrow superheated and thus highly electrically conductive channel between two electrodes.

We have invented certain improvements in the method and apparatus disclosed in said Karlovitz Patent No. 3,004,137 whereby an electrically augmented flame as there described can be more easily initiated and whereby the electrical discharge is more uniformly distributed through the flame and products of combustion. Thereby more electrical power can be introduced into said hot gases without causing contraction of the discharge into an arc than is possible by employing the method and apparatus disclosed in said patent.

Furthermore, in another aspect of this invention the above mentioned improvements can be utilized for various chemical reactions, and in particular for the gas phase synthesis of acetylene. In particular, a distributed electrical discharge and combustion combination are utilized in a unique and novel combined method and apparatus for obtaining the synthesis of acetylene. In the preferred method and apparatus aspect of the invention, the pyrolysis feed stock, such as natural gas, is injected in annular jet flow, concentric with and surrounding the flow of combustion. Hereinafter, for convenience, "methane" and "natural gas" are used interchangeably. Mixing and electrical heating occur in the same part of the reactor, and each tends to compensate for the effects of the other to produce a nearly isothermal reaction zone. As an example of the advantages obtained with the present invention when utilized for the synthesis of acetylene, in the preferred embodiment, an acetylene concentration of 12.23 volume percent (equivalent to 22.80 weight percent) was obtained under experimental conditions. Present commercial partial combustion processes, which are highly optimized, are reported to produce approximately 7–8 volume percent acetylene.

In the accompanying drawings we have illustrated certain presently preferred embodiments of our invention in which:

FIGURE 8 is a broken central longitudinal section through an alternative embodiment of a burner embodying our inventions as utilized for chemical reactions, and in particular for the gas phase pyrolysis of methane in the formation of acetylene;

FIGURE 9 is an alternative embodiment of a reactor containing a burner embodying our inventions which utilizes radial fourth stage injection of methane for the synthesis of acetylene;

FIGURE 10 is the preferred embodiment of a reactor containing a burner embodying our inventions and utilizing sheath-flow, third stage injection of methane for the economical synthesis of acetylene from methane;

FIGURE 11 is a sectional view illustrating the third stage electrode manifold incorporating the preferred sheath-flow aspect of the present invention for acetylene synthesis; and FIGURE 12 is a sectional view taken along section lines XII—XII of the third stage sheath injection manifold illustrated in FIGURE 11.

In order to distribute a powerful electrical discharge in a highly diffused state through a stream of gas and to avoid the formation of arcs or filamentary discharges, it is preferable that the stream of gas have certain physical characteristics prior to the application of the discharge. First, the gas should have a controlled degree of electrical conductivity. This condition is obtained by supplying ionizing additives to the gas, for example, powdered potassium chloride or other material having a low ionization potential and by heating the gas to a temperature at which the ionizing additives are vaporized and ionized, as hereinafter explained.

Second, the gases should have a high degree of turbulence so as to obtain uniform distribution of the ionized additives through the gases.

Figure 1:
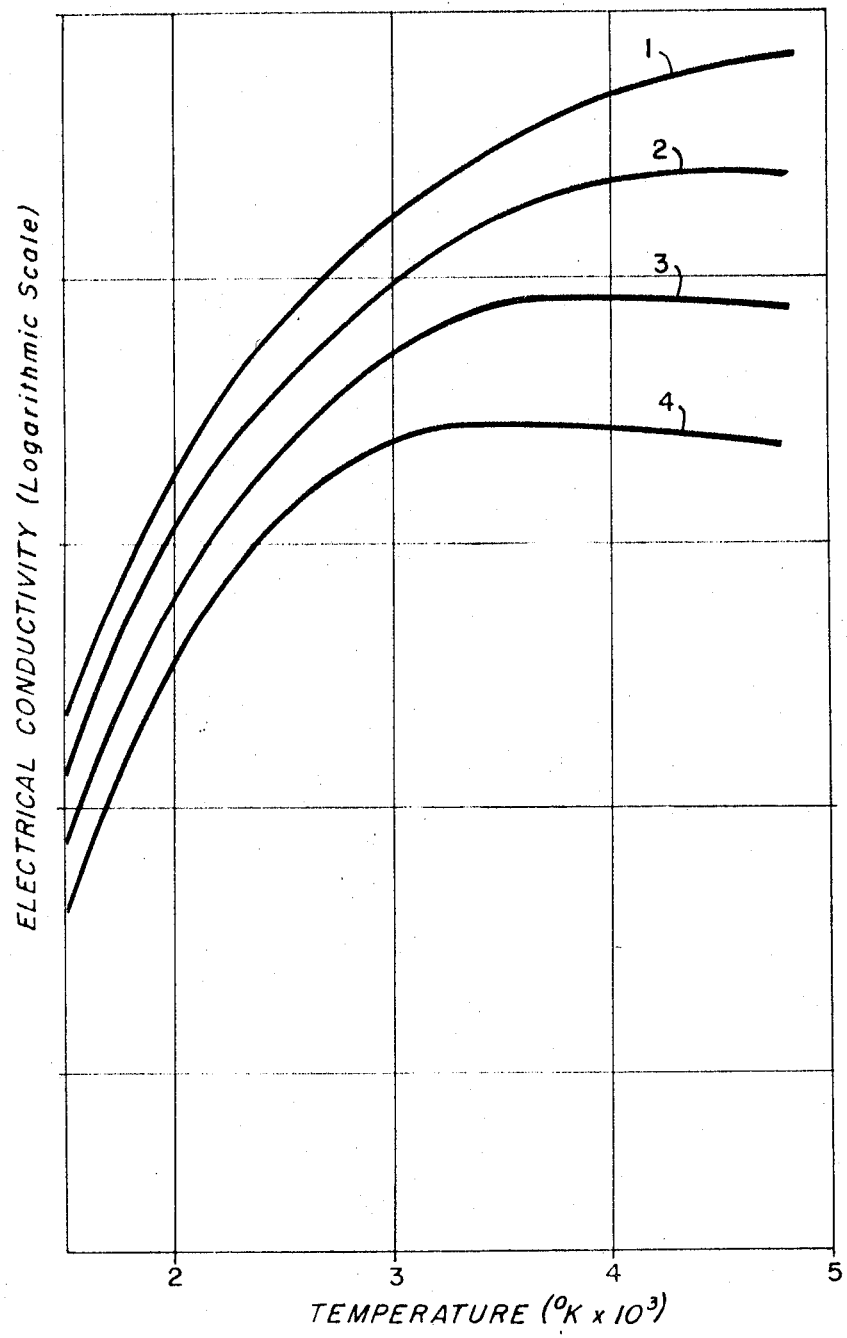
FIGURE 1 shows a series of curves in which the theoretically computed electrical conductivities of gases having varying concentrations of ionizing materials are plotted on a logarithmic scale against temperature.

Third, the gases preferably should be heated to a temperature at which the temperature coefficient of the electrical conductivity approaches zero. That is, the electrical conductivity of the gases will not rise by more than a factor of 2 upon an increase in temperature of 1000° K. This condition is more important when operating the burner with a direct current power supply. When operating with a low frequency single phase alternating current supply, such as 60 c.p.s., there is not produced a time uniform heating of the burner gases and hence a self-limiting effect is introduced in the thermal ionization of the additive. The importance of this preferred condition is shown in the curves of FIGURE 1 in which the theoretically computed electrical conductivities of gases having varying concentrations of potassium chloride are plotted on a logarithmic scale against temperature. In FIGURE 1 the curves 1, 2, 3 and 4 represent starting concentrations of potassium chloride which decrease by a factor of 10 with increasing curve numbers. These curves are computed assuming a constant electron mobility value and neglecting ionization of the gases other than the additive. Referring to these curves, it will be seen that at low temperatures the electrical conductivity increases rapidly with temperature, but, that above a certain temperature, there is no substantial increase in electrical conductivity within the temperature range shown, the conductivity reahing a plateau for each concentration of ionizing additive. If the temperature of the gas is below the point at which the electrical conductivity reaches a plateau, then, upon the application of an electrical discharge, the increase in temperature of the gas due to the addition of electrical energy will increase the electrical conductivity of the gas rapidly, and there is great likelihood that the discharge will break down into an arc or a bundle of filamentary discharges. If, however, the temperature of the gas prior to the application of an electrical discharge is such that the electrical conductivity of the gas has approached a plateau, i.e., the temperature coefficient of electrical conductivity has approached zero, as defined above, then an increase in temperature due to the electrical energy applied will not appreciably increase the electrical conductivity. It will be noted from FIGURE 1 that both the concentration of ionizing additives added to a gas and the temperature determine when the electrical conductivity reaches a plateau.

In accordance with our invention we prepare a stream of gas for the application of a powerful distributed electrical discharge in two stages or zones.

In the first stage or zone, a relatively small amount of a combustible mixture is burned to form a pilot flame, and the material which acts as an ionizing additive, for example, potassium chloride or other easily ionizable materials having low ionization potentials, is fed into the pilot flame which heats and partially vaporizes and ionizes these materials.

In the second stage or zone the balance of the combustible mixture which will be burned to suppy the combustion energy in the process is introduced to the pilot flame and ignited by that flame. The combustion flame completes the vaporization of the ionizing materials and further ionizes them, but only to such a degree that the gases will support a distributed electrical discharge only if the power of the electrical discharge is kept to a relatively low value. If the electrical energy is increased beyond this value, the electrical discharge will break down into an arc or a group of filamentary arcs which together give the appearance of a "fat" arc. Accordingly, in this second stage, we add additional heat to the gases to increase their temperature to a level at which the additives are at least 50% ionized and the electrical conductivity of the gases will not rise by more than a factor of 2 upon an increase in temperature of 1000° K. This is done by maintaining an electrical discharge through the gases downstream of the pilot flame. Sufficient electrical energy is applied to the gases in this second stage or zone to ionize the additives to the extent indicated above and to complete combustion of the combustible mixtures. In this stage the gases have a high degree of turbulence, so that the electrical conductivity is uniform throughout the gases when they leave the second stage and the gases have been heated to a temperature at which the temperature coefficient of electrical conductivity approaches zero.

The gases then flow into a third stage or zone where the major portion of the total electric power is applied. The power is applied in the form of an electrical discharge, which, due to the favorable condition of the gases, is distributed in a highly diffused state through the gases.

Figure 2:
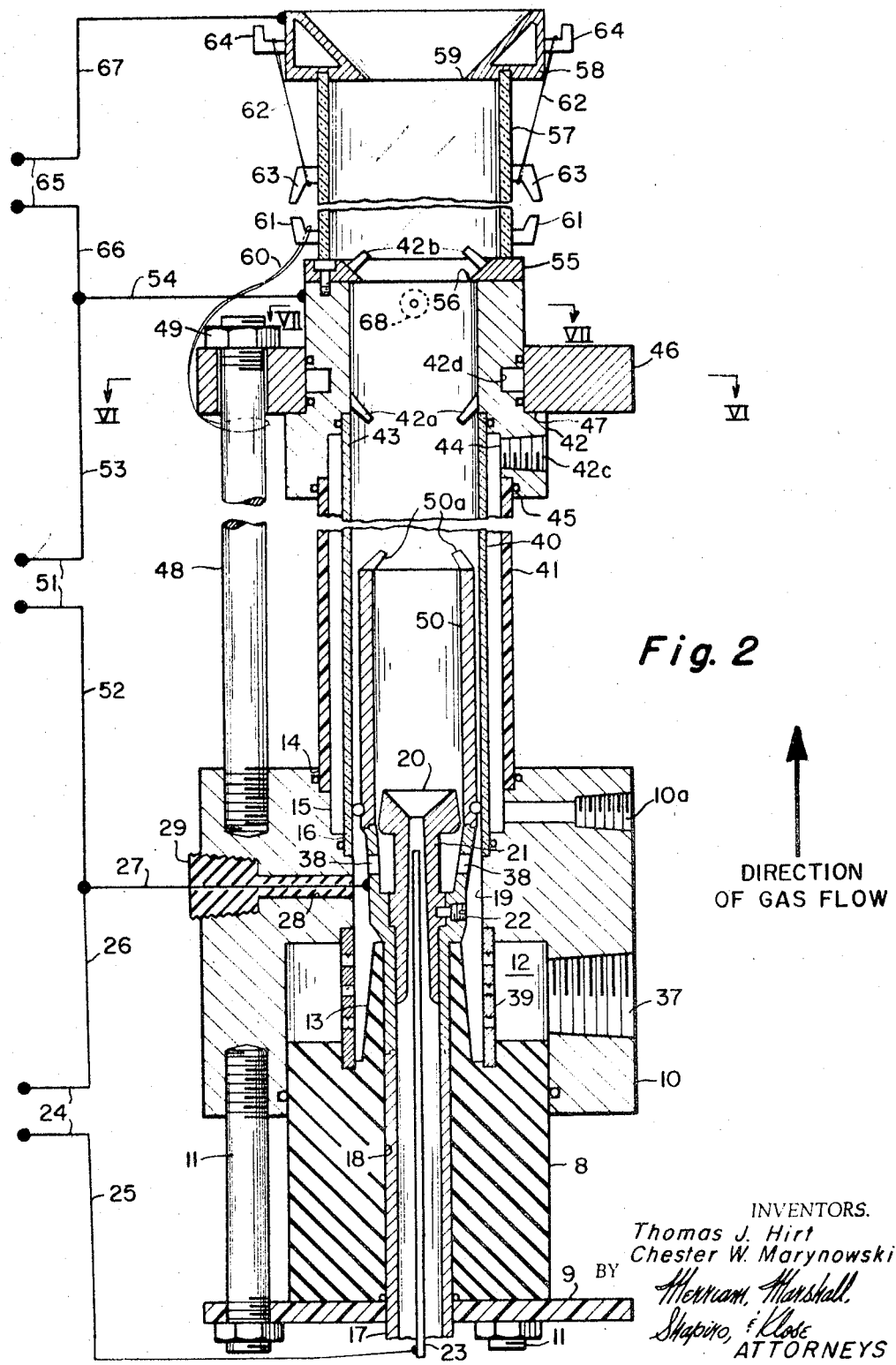
FIGURE 2 is a broken central longitudinal section through a burner embodying our invention, in which electrical connections have been shown schematically and in which the direction of gas flow through the burner is indicated by an arrow.

FIGURE 2 shows a burner embodying our invention and comprising a block 8 of insulating material held by a flange 9 to the main body 10 of the burner by bolts 11.

The main body 10 has a cylindrical recess 12 formed in its base into which the block 8 partially extends. At a point approximately half the depth of the recess 12 the insulating block 8 is reduced in diameter to form a conical-shaped extension 13 having a passageway therethrough. The downstream end of the main body 10 has a series of concentric cylindrical recesses 14, 15 and 16 which decrease in diameter in the order stated and support other parts of the apparatus as will be later explained.

A metal burner tube 17 extends through the flange 9 and through a passageway 18 in the insulating block 8 and the extension 13 of the block. From the extension 13 the tube 17 extends through a passageway 19 in the main body which connects the recesses 12 and 16. Beyond the extension 13 the tube tapers outwardly in increasing diameter and terminates at approximately the plane between recesses 15 and 16.

A pilot burner tip 20 is centrally positioned in the recess 15 of the main body by means of a stem 21 which fits into the tube 17, being held in the tube by set screws, one of which is shown at 22.

Figure 3:
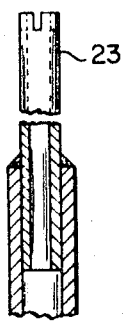
FIGURE 3 is a longitudinal section on an enlarged scale of a pilot tube used in the burner of FIGURE 2.
Figure 4:
FIGURE 4 is a plan view of the pilot tube shown in FIGURE 3.

A pilot tube 23 extends through the tube 17 and the stem 21 to a point adjacent the burner tip 20. The pilot tube 23 is used to supply fuel and ionizing additives to the burner tip 20 and the annular space between the tubes 17 and 23 is used to supply air or oxygen to the tip. As shown in FIGURES 3 and 4, the inner end of the tube 23 is slotted so as to obtain a certain amount of premixing of the fuel and air or oxygen before they reach the tip 20.

A spark between the stem 21 of the burner tip 20 and the outer end of the tube 23 is used to ignite a pilot flame at the tip 20. A radio frequency voltage source 24 supplies the spark. A lead 25 connects the voltage source to the tube 23 and leads 26 and 27 connect the source to the stem 21 through the tube 17, the lead 27 extending through a radial passage 28 in the main body 10 and being centrally positioned in the passage by an insulating plug 29.

Figure 5:
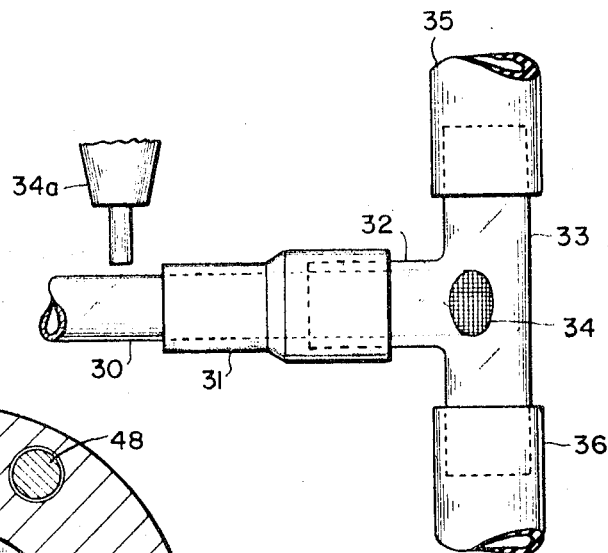
FIGURE 5 is a fragmentary elevation view, partly broken away, of apparatus which we use to introduce ionizing additives to the burner of FIGURE 2.

FIGURE 5 shows apparatus which we employ to introduce ionizing additive into the pilot flame through the pilot tube 23. This apparatus delivers into the flow of fuel potassium chloride powder which has been ball-milled and sieved until it passes through a 325 mesh screen. The powder is fed from a vibrating feeder (not shown) to a tube 30 which is connected by flexible tubing 31 to the base 32 of a glass T 33. Mounted on the tube 30 within the base 32 is a 180 mesh screen 34 which breaks up any agglomerated particles. An auxiliary vibrator 34a clears the screen. A tube 35 leading from a source (not shown) of fuel (for example, methane) is connected to one arm of the T 33. The other arm of the T carries tubing 36 which leads to the pilot tube 23.

The main portion of the combustible mixture is premixed outside of the apparatus and is fed to the recess 12 in the main body 10 through an opening 37. From the recess 12 the combustible mixture flows through the annular space between the tube 17 and the passage 19 in the main body and through openings 38 in the tube 17 into the space between the stem 21 and the tube 17 and thence outwardly past the burner tip 21 where it is ignited. A perforated sleeve 39 is placed around the conical extension 13 of the block 8 and within the recess 12 of the body 10 to distribute the combustible mixture through the recess 12 and improve mixing between the fuel and the oxidizing components of the combustible mixture.

The portions of our apparatus so far described comprise the first stage or zone of the apparatus.

The second stage of the apparatus comprises a tube 40 of heat-resistant glass, for example, glass sold under the trademark "Vycor," the upstream end of which fits within the recess 16 in the main body 10. A second tube 41 of transparent plastic material, for example, that sold under the trademark "Lucite," surrounds the tube 40 and at its upstream end rests in the recess 14 in the main body 10. An electrode 42 is positioned at the downstream ends of the tubes 40 and 41. It is in the form of a hollow cylindrical body having at one end concentric bores 43, 44 and 45 of increasing diameter. The tubes 40 and 41 fit into the bores 43 and 45 respectively. The electrode may have discharge points 42a and 42b to assist in the application of an electrical discharge into the hot center of gases flowing through the burner and to protect the tube 40 by diverting electric arcs from its periphery.

A flange 46 rests on a shoulder 47 formed in the outer periphery of the electrode 42. Bolts 48 and nuts 49 hold the electrode 42 and the tubes 40 and 41 to the main body 10.

A metal tube 50 concentric with the tube 40 and within the tube extends from the downstream end of the burner tube 17 towards the electrode 42 and is used as an electrode to apply an electrical discharge to gases within the tube 40 between the tube 50 and the electrode 42.

A high voltage AC power supply 51 is connected across the tube 50 and the electrode 42 by a lead 52 connected to the lead 27 and by leads 53 and 54, the second of which is connected to the electrode 42. The tube 50 may have discharge points 50a for the same purpose as the discharge points 42a and 42b on the electrode 42.

Figure 6:
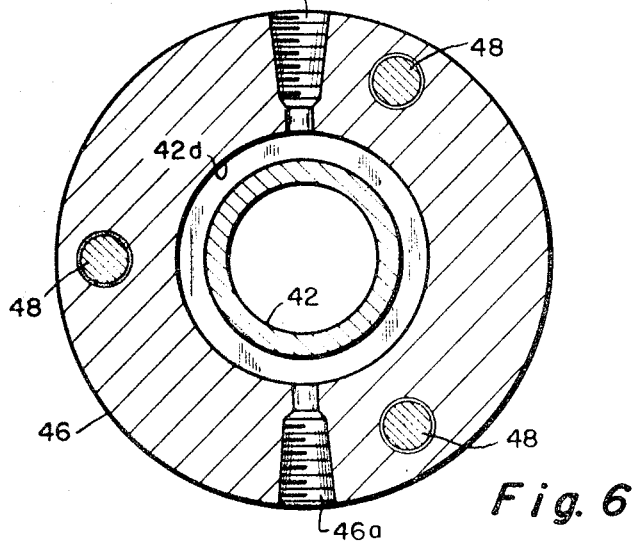
FIGURE 6 is a section along the line VI—VI in FIGURE 2.

Gases within the tube 40 are at high temperatures and, therefore, water-cooling is used. Cooling water flows through the passage 10a in the main body 10 leading to the recess 15 in the main body, then to the annular space between the tubes 40 and 41 and thence into the bore 44 in the electrode 42 and from that bore out through an opening 42c in the electrode 42. The electrode 42 is further water-cooled. As shown in FIGURE 6 water may be supplied to one of two radial passages 46a formed in the flange 46 and extending into a groove 42d cut in the outer surface of the electrode 42 inside the flange 46.

An orifice plate 55 is secured to the downstream end of the electrode 42 and has an orifice 56 which is less in diameter than the inner diameter of the hollow electrode 42.

This completes the description of the second stage or zone of our apparatus.

The third stage or zone of our apparatus comprises a second heat-resistant glass tube 57 which extends from the orifice plate 55 and is concentric with the orifice 56. The downstream end of the tube 57 carries a second electrode 58 which is in the form of a hollow ring, the inner diameter of which forms an orifice 59 which is less in diameter than the inner diameter of the tube 57.

The upstream end of the tube 57 is secured to the orifice plate 55 by wires 60 which extend around the bolts 48 and hooks 61 secured to the outer surface of the tube adjacent its upstream end. The electrode 58 is secured to the downstream end of the tube 57 by wires 62 which extend around hooks 63 secured to the outer surface of the tube adjacent its downstream end and hooks 64 affixed to the outer surface of the electrode 58.

A second high-voltage alternating current source 65 is connected across the electrodes 42 and 58 by a lead 66 connected to the lead 54 and by a lead 67 connected to the electrode 58.

The electrode 58 is also water-cooled, cooling water being supplied to its hollow interior by conventional means not shown.

The operation of our apparatus will now be described. A fuel, such as methane, and an ionizing additive are fed through the pilot tube 23 into the stem 21 of the pilot tip 20. Oxidizing material (air or pure oxygen) is fed through the tube 17 and it mixes within the stem 21 at the end of the pilot tube 23 with fuel and additive. The combustible mixture is ignited by a spark supplied by the radio frequency voltage source 24 and burns at the pilot burner tip 20.

The main volume of the combustible mixture flows through the opening 37 into the recess 12 in the main body 10, then through openings 38 in the burner tube 17 into the space between the burner tip 20 and the tube 50 where it is ignited by the pilot flame.

In the tube 50 the gases supplied to the pilot are completely combusted and the main volume of gases supplied through the opening 37 are ignited. There is also partial vaporization of the ionizing additive within the flame and the tube 50 has sufficient length to provide residence time for the additives to obtain such partial vaporization. This length is determined by calculations based on heat transfer considerations, on the size of the additive particles, the particle velocity and the flame temperature. The gases have the desired high degree of turbulence but their electrical conductivity is low and is not uniform due to the low degree of ionization of the ionizing additive. In order to bring the gases to a temperature at which the electrical conductivity approaches a plateau such as is shown in the curves of FIGURE 1, a high voltage discharge (in the neighborhood of 2000 to 3000 volts) with relatively low current (10 to 20 amperes) is superimposed on the gases between the downstream end of the tube 50 and the electrode 42. The amount of the current depends upon the concentration of the ionization additive and the nature of the discharge. At low additive concentrations and at low power levels the discharge remains uniformly distributed. Higher additive concentrations and higher power levels cause the discharge to become filamentary. However, a filamentary discharge in the second stage will not affect the operation of the third stage. The important functions of the first and second stages are, first, to supply energy to the gases to heat them to the required high temperature, and, second, provide sufficient residence time to vaporize the additives and ionize them to the required degree.

The amount of electrical energy introduced in the second stage is approximately 10 to 20% of the combustion energy. Combustion is substantially complete (greater than 95%) and the ionizing additives have approached the high degree of ionization heretofore defined. Gases thus treated in the second stage are passed into the third stage within the tube 57 and are in condition for the application of an electrical discharge between the electrodes 42 and 58. Because the gases are turbulent and at a high temperature at which the temperature coefficient of electrical conductivity approaches zero, the discharge is uniformly distributed in a highly diffused state through the gases, and a very substantial amount of electrical energy can be imparted to these gases, thus raising them to still higher temperatures.

The following data were obtained from actual operation of the apparatus described above. The pilot flame was maintained by oxygen flowing at the rate of 2 cubic feet per minute and natural gas flowing at the rate of 1 cubic foot per minute. Potassium chloride salt was injected into the pilot flame at a rate corresponding to a partial pressure ranging between $0.67 \times 10^{-5}$ atmospheres and $2 \times 10^{-5}$ atmospheres. The main combustion flame was supplied by air flowing at the rate of 55.5 cubic feet per minute and natural gas flowing at the rate of 5.85 cubic feet per minute. Voltage in the second stage between the tube 50 and electrode 42 was maintained at 1500 volts producing a current of 15 amperes.

Gases in the second stage received 100 kilowatts of combustion energy and 22.5 kilowatts of electrical energy. Allowing thermal losses at 10% the energy input to the gas was 1549 kilogram-calories per minute. Using the heat capacity of nitrogen as an approximation, the temperature of the gas entering the third stage can be calculated to be approximately 2985° K.

In one operation 4500 volts were applied between the electrode 42 and the electrode 58 producing a current of 15 amperes. In another operation the voltage applied was 2000 volts, and the current produced was between 20 and 25 amperes. Thus, in the two operations, the electric power input to the gases in the third stage varied between 40 and 67.5 kilowatts.

In this specification we have referred primarily to the use of potassium chloride salt as an ionizing additive. Other materials can be used as such additives, provided that they have low ionization potentials and the boiling point of the material, if a liquid, or the particle size, if a solid, are such that they can be completely vaporized in the second stage of the apparatus.

The potassium chloride salt which we have used in operation of the burner shown in FIGURE 2 has a surface-mean particle diameter of approximately 8 microns. Heat transfer calculations show that a practical upper size limit is bout 10 microns in order to obtain complete vaporization, dissociation and ionization of the potassium chloride within the first and second stages. The lower particle size is determined by considerations of mechanical handling problems associated with agglomeration of extremely fine powders.

Thus, our method and apparatus provide an effective way for obtaining gases at temperatures which are much higher than can be obtained by the burning of ordinary fuels. At the same time, problems arising from the use of heavy arcs are avoided.

Figure 7:
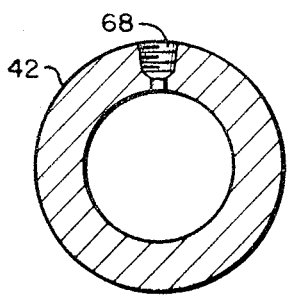
FIGURE 7 is a section along the lines VII—VII of FIGURE 2.

It is also possible to carry on thermally promoted chemical reactions within the gases in the third stage. The chemical reactants can be introduced at any stage in our process, but a convenient way is to add them at the beginning of the third stage. For this purpose we provide a radially extending opening 68 in the side of the outer end of the electrode 42 as shown in FIGURE 7.

If the thermally promoted chemical reaction is such that it cannot be contaminated by the products of combustion produced in the first and second stages, the combustion energy input in the first and second stages can be gradually reduced and eliminated and the electrical input to the second stage can be increased. In this manner also, non-combustible gases can be heated by supplying them to the first and second stages as replacements for the combustible gases which were originally supplied.

The third stage of our method and apparatus need not be limited to one pair of electrodes. Alternating series of electrically connected cathodes and anodes can be positioned downstream of the first pair of electrodes, and the gases can pass through successive pairs of electrodes and have additional electrical energy imparted to them. In this manner, relatively long residence times of chemical reactants in high temperature zones can be maintained.

Referring now to FIGURE 8 there is illustrated an alternative embodiment of the burner shown in FIGURE 2 which is useful for performing various chemical reactions such as the pyrolysis of hydrocarbons with the appropriate elemental gases to produce acetylene, vinyl chloride, fluorocarbons or other halocarbons, etc. In particular, the illustrations of FIGURES 8-12 will be utilized to describe the pyrolysis of methane to form acetylene, although it is to be understood that such description is merely for illustrative purposes and the apparatus and the techniques herein to be described can be readily applied to other chemical reactions.

It is known that natural gas, i.e., methane becomes unstable relative to acetylene only at temperatures above 1500° K., therefore the efficient conversion of methane to acetylene requires temperatures at least as high or higher. Higher molecular weight hydrocarbons are less stable than methane, and can be converted to acetylene at lower temperatures. From well known data showing the free energies of formation of various hydrocarbons, it can be found that methane becomes unstable relative to the elements hydrogen and carbon at temperatures above 800° K. Hence, if methane is to be converted to acetylene—rather than to hydrogen and carbon—its exposure time at temperatures between 800° K. and 1500° K. must be minimized. Higher hydrocarbons can be cracked to the elements at temperatures even lower than 800° K.

Acetylene remains unstable relative to the elements until about 4200° K. The only reason the synthesis of acetylene by cracking of saturated hydrocarbons is practical in that the thermal decomposition of saturated hydrocarbons to the elements proceeds through acetylene as an intermediate compound and that the acetylene formation step is faster than the acetylene decomposition step. Both steps occur very rapidly at cracking temperatures, and rapid quenching (within milliseconds) of the intermediate products to a temperature of below about 800° K. is essential if acetylene is to be recovered as a final product. Above about 2000° K., the acetylene decomposition reaction becomes so fast that efficient quenching becomes impracticably difficult. Thus, there is an optimum temperature range for acetylene synthesis between about 1500° K. and 2000° K., for methane feeding, slightly lower for higher hydrocarbon feed stocks. Also, it can be seen that the accurate control of reaction kinetics is necessary for efficient acetylene synthesis.

Several commercial acetylene processes are based on either partial combustion of part of the hydrocarbon feed stock or electrical arc pyrolysis of saturated hydrocarbons. In accordance with the principles of the present invention, in the following aspects of the invention there will be described the use of a distributed electrical discharge in conjunction with combustion for the synthesis of acetylene.

Three specific burners or reactors will be described. FIGURE 8 illustrates one embodiment of the invention which is very similar to the burner shown in FIGURE 2, and wherein the methane or natural gas is injected into the second stage of the burner. FIGURE 9 illustrates another alternative embodiment of this aspect of the invention wherein the natural gas for pyrolysis is injected into a fourth stage unit immediately following the first three stages of the burner as illustrated in FIGURES 2 and 8. FIGURES 10-12 illustrate the preferred embodiment of this invention wherein the natural gas for pyrolysis to acetylene is injected into the third stage of the reactor and in such a manner that mixing of the pyrolysis fuel and electrical heating occur at the same part of the reactor, so as to produce a nearly isothermal reaction zone.

With reference to FIGURE 8, it can readily be seen that the illustrated reactor closely resembles the burner of FIGURE 2, with the differences being primarily in the manner of construction of certain apparatus and not in the operation thereof. Therefore, for convenience in describing the reactor of FIGURE 8, similar apparatus in FIGURES 2 and 8 have been given the same reference numeral. In the apparatus of FIGURE 8, the main combustion fuel plus the excess for pyrolysis to acetylene is introduced into the opening 37. The fuel passes through the slotted sleeve or ring 39 and through openings 38 in the tube 17 and past the burner tip 21 where it is ignited. The first stage of the reactor shown in FIGURE 8 is therefore virtually identical to the first stage of the burner shown in FIGURE 2. Also, for convenience, the radio frequency voltage source 24 shown in FIGURE 2 for igniting the pilot flame is not illustrated in FIGURE 8.

The second stage of the reactor comprises a heat resistant "Vycor" tube 70 similar to the tube 40 of FIGURE 2, with an upstream end which fits within the recess 16 in the main body 10. An electrode assembly 72 is positioned at the downstream end of the tube 70 with one end of the tube 70 fitted into a bore 74 in the electrode assembly 72. The electrode assembly 72 includes a set of discharge electrodes 72a and a second set of discharge electrodes 72b. It is to be understood that each set of electrodes 72a and 72b includes three electrodes at 120°, although such placement of the electrodes is not critical and is given merely for illustrative purposes. The electrode assembly 72 is mounted between a first metal flange 76 and a second metal flange 78, and maintained in contact therewith by a number of hold down bolts 80. Spacing of the flange 76 is controlled by three phenolic studs 82 separated by 120°, and for convenience only one of which is shown in FIGURE 8. A brass spacer 84, nut 86, and spring 88 at one end of the phenolic stud 82 maintain the flange 76 firmly in position. The remaining end of the stud 82 has a threaded end 90 which screws into a nut 92 attached to a flange 94. The flange 94 is affixed to the main body 10 by means of a series of hold down bolts 96.

The electrode assembly 72 is a hollow body so that it can be readily cooled. The cooling liquid, such as water, can be supplied to either one of two radial passages 100 so as to thereby flow into the hollow portion 102 in the electrode assembly 72 and hence out the other radial passage 100. It is to be noted that the electrode assembly 72 includes a constricted inner portion 104 which defines an orifice 106. The orifice 106 is less in diameter than the inner diameters of the hollow electrode assembly 72 and the tube 70.

The third stage or zone of the reactor shown in FIGURE 8 comprises a second heat resistant "Vycor" glass tube 108 which extends from the electrode assembly 72 concentrically with the orifice 106. The upstream end of the tube 108 extends from an annular inner recess 110 in one end of the electrode assembly 72. The downstream end of the tube 108 fits into an annular recess 112 of another electrode assembly 114. The electrode assembly 114 is in the form of a hollow ring, the inner diameter of which forms an orifice 116 which is less in diameter than the inner diameter of the tube 108.

In order to provide cooling for the glass tube 108, another "Vycor" tube 118 has a diameter slightly larger than the tube 108 and extends concentrically to said tube from an outer annular recess 120 in electrode 72 to an inner bore 122 in electrode assembly 114. The tube 108 is cooled by means of cooling air being supplied to one of the radial passages 124 and passing through the space 126 between the tubes 108 and 118 and out through the other radial passage 124. The electrode 114 is also cooled be means of cooling water presented to one of the radial passages 128, so that the water can circulate through the interior of the electrode 114 and exit therefrom through the other radial passage 128.

The upper electrode 114 is maintained in spaced relationship to the electrode assembly 72 by means of a flange 130 which fits into a shoulder 132 of the electrode 114. A phenolic stud 134 has one threaded end which is screwed into a nut 136 attached to the flange 76 and a second threaded end having a spring 138 and an adjusting nut 140 suitably engaging the phenolic stud 134 to firmly maintain the electrode 114 in position. It is to be understood that similar to the phenolic stud 82, three studs 134 are spaced at 120° around the flanges 130 and 76, with only one of the studs being illustrated in FIGURE 8.

In order to supply the electrical power required to operate the reactor of FIGURE 8, a first high voltage alternating current source 142 is connected across electrode assembly 72 and the tube 50 by a lead 144 having one end connected to one end of the electrical power source 142 and another end connected to a terminal 146, and by a lead 148 connected between the other end of the electrical power source 142 and the tube 50. Similarly a second high voltage alternating current source 150 is connected across an electrode assembly 72 and electrode 114 by the lead 144 and another lead 152 connected to the terminal 154 on electrically grounded flange 130.

In order to detect the amount of acetylene formed by the reactor in FIGURE 8, a gas sampling probe 156 is located in the vicinity of the exit flame at the end of the electrode 114. Such sampling probes are well known in the art and function by preserving the gas composition by rapid cooling. The output of the sampling probe 156 is coupled to a residual gas analyzer in order that some quantitative results could be obtained.

In operating the reactor as shown in FIGURE 8 during the pyrolysis of methane for acetylene formation, the same start up and operating procedures as previously described in connection with the burner of FIGURE 2 were utilized. Briefly, a fuel, such as methane, and an ionizing additive are fed through the pilot tube 23 into the stem 21 of the pilot tip 20. Oxidizing material is fed through the tube 17 and the combustible mixture is ignited by sparks applied by an R.F. voltage source similar to the voltage source 24 illustrated in FIGURE 2.

The main methane combustion fuel flows through the opening 37 and into the tube 50 where it is ignited by the pilot flame. As described previously, the ionizing additive and the electrical power sources 142 and 150 are adjusted continuously until the desired operation is obtained with a uniformly distributed discharge in the third stage zone between electrode assembly 72 and the down stream electrode 114.

After normal operation of the reactor has been established as hereinabove described, the reactor can be placed into the fuel rich mode for the more efficient production of acetylene from the input methane in accordance with the following procedure. The flow of air which is mixed with methane and injected into opening 37 is reduced in approximately 10% increments followed by continuous adjustment of increases in the pilot oxygen through tube 17 in approximately 20% increments and by either maintaining the methane input to opening 37 steady or increasing the same in 10% increments. In the final operating condition it is preferred to operate with 100% methane and oxygen, and no air input. It is to be understood that these operations will reduce the combustion power so that adjustments in the voltages supplied between electrodes 50a and 72a and between electrodes 72b and 114 must be made in order to keep the electrical power constant. In most cases this can be most conveniently accomplished by increasing the voltage supplied by power source 142 slightly and subsequently increasing the voltage supplied by the source 150. The specific results in acetylene production will be detailed after the alternative embodiments of FIGURES 9–12 have been described so that a direct comparison can be made.

Referring now to FIGURE 9 there is illustrated an alternative embodiment of a reactor for gas phase reactions in which the modifications to the reactor shown in FIGURE 8 consists of essentially two structural changes: (1) the addition of a fourth stage 160 to the burner; and (2) the addition of a gas injection manifold 162 at the upstream end of the fourth stage, providing secondary injection of the fuel for pyrolysis.

The fourth stage was essentially an extension of the third stage having the same inside diameter and constructed of "Vycor" glass tube 164. A pair of brass retaining flanges 166, one at the upstream end of tube 164 and another at the downstream end of tube 164 maintained the fourth stage in position by means of three metal stay-bolts 168, only one of which is shown for illustrative purposes in FIGURE 9. Each of the stay-bolts 168 threadably engages the flange 130 at the downstream end of the electrode 114 to securely maintain the fourth stage 160 in position. Adequate protective cooling of the fourth stage tube 164 was provided by directing a number of small compressed air jets at the tube from a surrounding distributor ring 170 constructed of ⅜ inch copper tubing having an array of small holes drilled along the inner face of the ring 170.

The fourth stage methane injection manifold 162 is a cylindrical distributor ring provided with a two row array of 16 critical-flow orifices 172, each of the orifices being oriented nearly radially. The orifice pattern was dictated by the desire to provide a maximum rate of mixing of the injected gas with the burner gases exiting from tube 108. The excess methane for pyrolysis to acetylene was supplied through a radial inlet port 174 which communicates with the orifices 172 so that the excess methane mixed with the burner gases exiting from the third stage electrode 114.

In operation, the reactor of FIGURE 9 differed from the reactor of FIGURE 8 in that the gases flowing through the first three burner stages were much less fuel rich. In the reactor of FIGURE 9, the third stage gases had to be superheated to a level approaching 3000° K. in order that their subsequent dilution and reaction with the main natural gas would result in a mixture in the optimum temperature range of 1500–2000° K. for acetylene synthesis. This meant that at least part of the main natural gas in the third stage was exposed briefly to temperatures favoring rapid decomposition of acetylene to hydrogen and carbon. The severity of such undesirable decomposition reactions would, of course, depend on the rapidity with which mixing was accomplished in the fourth stage 160.

While the reactor configurations of FIGURES 8 and 9 produced promising results in acetylene formation, even under non-optimized conditions, the preferred reactor configuration for acetylene synthesis is illustrated in FIGURES 10–12. This preferred configuration for the reactor resulted from the following considerations. The combustion gases leaving the second stage of the burner, that is, at the exit of electrode 72, need only be hot enough to provide good preconditioning for the third stage discharge. In other words, the temperature of the combustion gases need be only slightly above the 1500° K. optimum temperature at which methane is cracked to acetylene. Since electrical energy is added throughout the length of the third stage, between electrode 72 and 114, this mixing of the main natural gas could also be accomplished throughout the length of the third stage. The electrical heating of the gases could be roughly balanced throughout by the cooling from dilution and reaction of the injected methane. Thus, cracking of the injected methane would occur at a nearly isothermal, optimum temperature, mixing zone surrounding a slightly hotter central core in which the electrical discharge was maintained.

The above result could be approached in practice in several ways. One technique would be to provide a series of peripheral gas injection ports, distributed along the length of the third stage. A somewhat simpler approach is illustrated in FIGURES 10–12 wherein the original electrode 72 at the upstream end of the third stage is replaced with a modified electrode and sheath injection manifold 180, having an inner diameter defining an orifice 181 and providing secondary injection of the fuel for pyrolysis. The third stage electrode-manifold 180 provides an annular gas injection port, with the annular opening 182 oriented in the axial direction of the burner. The width of the annular opening 182 is specifically designed to provide an approximate match between the velocity of the injection gas and that of the combustion gas exiting from tube 70. In this way, the relative sheer between streams could be minimized, and the mixing process could be spread over a large fraction of the third length.

The construction details of the third stage electrode-manifold 180 can be more clearly seen by referring to FIGURES 11 and 12. As illustrated therein, the excess methane for pyrolysis to acetylene is coupled into the manifold 180 by means of an inlet port 184. The injected methane passes through the inlet 184 into a hollow interior portion 186 of the manifold 180 and thence out through the annular opening 182. Cooling of the third stage electrode-manifold 180 is provided by cooling water fed into the hollow interior of the manifold through radial inlet and outlet ports 188. Three electrodes 190 are included in the electrode-manifold 180 with the electrodes separated by 120° and offset 15°. Similar to that previously described in connection with FIGURE 8, the downstream end of the "Vycor" tube 70 is inserted into a bore 192 in the upstream end of manifold 180. The reactor shown in FIGURES 10–12 also provides two essential advantages over the reactor shown in FIGURES 8 and 9. Because of the presence of a cool sheath of injection gas out of the opening 182 which is adjacent to most of the third stage surface along and within the tube 108, the thermal shock problem in connection with the tube 108 could be expected to be greatly alleviated, and heat losses to the walls of the tube 108 could be expected to be significantly reduced. Although no quantitative measurements of heat losses were obtained in operating the reactor of FIGURE 10, we have found that a much lower cooling air requirement for the third stage and in particular for the tube 108 is required.

It may be noted that similar sheath-flow approach could also be adapted to the burner in ordinary electrically augmented combustion operation. Only sufficient fuel and air need be introduced into the second stage to provide good pre-conditioning in the third stage; the rest of the fuel and air could be introduced in the form of a matched velocity sheath in the third stage.

In operating the radial, fourth stage injection reactor of FIGURE 9 and the sheath-flow, third stage injection reactor of FIGURE 10 for the synthesis of acetylene from methane, the same start up and firing procedure as previously described can be utilized. In the fuel rich mode, a small amount of methane is introduced by secondary injection into the inlet port 174 of the reactor in FIGURE 9 or the inlet port 184 of FIGURE 10 in order to obtain some mixing and cooling. This secondary injection of the excess methane for pyrolysis is continued along with continuous reduction of the air flow into opening 37 and an increasing of the second and third stage electrode voltages and the pilot oxygen input into tube 17 to keep the electrical power constant. It is to be understood that such adjustments are made in a step-by-step process in which initially a small amount of excess methane is put in by secondary injection, followed thereafter by a slight reduction of the air input, possibly a slight increase in the second and third stage electrode voltages, and a slight increase in the pilot oxygen input. This operation is again repeated starting with a small amount of secondary injection of fuel for pyrolysis, reducing the air, etc. The above described sequence may be understood to have the primary objective of achieving a smooth transition from initial to final valve and power settings without departing from the desired range of flame stability or exceeding the structural limitations of the device.

In a series of test runs using the reactors of FIGURES 8, 9 and 10, the amount of acetylene produced was obtained by means of a sample probe 156 such as is shown in FIGURE 8. Best results were obtained with the sheath-flow configuration of FIGURE 10 and this is to be considered the preferred embodiment, although in the test runs, the structure was not optimized for the best performance. Additional performance should be possible by refinement of the sheath injection geometry. Substitution of D.C. or multiphase A.C. power should result in better control of the reaction kinetics. For illustrative purposes and to provide examples of the present invention, three test runs for each of the reactor configurations shown in FIGURES 8, 9 and 10 have been detailed and are shown in the table below. In runs 31, 40 and 49 as shown in the table, electrical power was supplied between electrodes 50a and 72a, while in runs 145, 146, 149 and 240a–240c, electrical power was additionally supplied between electrodes 72b and 114.

ACETYLENE SYNTHESIS RUNS WITH NATURAL GAS INJECTED AT INDICATED LOCATIONS OF THREE STAGE BURNER

|  |  | 2nd Stage Injection Of Natural Gas For Pyrolysis (Figure 8) | | | Secondary 4th Stage Radial Injection Of Natural Gas For Pyrolysis (Figure 9) | | | Secondary 3rd Stage Sheath Injection Of Natural Gas For Pyrolysis (Figures 10–12) | | |
|---|---|---|---|---|---|---|---|---|---|---|
| Run No. | | 31 | 40 | 49 | 145 | 146 | 149 | 240a | 240b | 240c |
| Second Stage | Volt. (v) | 1700 | 2100 | (a) | (a) | (a) | 1800 | 1400 | 1400 | 1400 |
| | Power (kw) | 17 | 15 | 12 | 10 | 11 | 15 | 13 | 13 | 13 |
| Third Stage | Volt. | NA | NA | NA | 2000 | 2000 | 2000 | 4200 | 4200 | 4200 |
| | Amps. | NA | NA | NA | 44 | 44 | 69 | (a) | (a) | (a) |
| | Power Factor | NA | NA | NA | 0.45 | 0.45 | 0.40 | 0.7 | 0.7 | 0.7 |
| | Power (kw) | NA | NA | NA | 40 | 40 | 55 | 66 | 66 | 66 |
| Natural Gas Mass Velocity (1) | | 982 | 1310 | 1260 | 2230 | 2230 | 1490 | 1860 | 1860 | 1860 |
| Ionizing Additive (2) | | (b) | (b) | (b) | 0.024 | 0.024 | 0.011 | 0.087 | 0.087 | 0.087 |
| Sample Probe Location (3) | Axial | 17.0 | 17.0 | 17.0 | 5.5 | 5.5 | 2.5 | 19.0 | 19.0 | 19.0 |
| | Radial | 0.0 | 0.0 | 0.0 | 0.0 | 0.0 | 0.0 | 0.5 | 0.5 | 0.5 |
| Quenched Effluent C$_2$H$_2$ Conc. (4) | Vol. % | 4.12 | 3.99 | 3.87 | 5.15 | 5.22 | 5.90 | 10.27 | 12.23 | 11.90 |
| | Wt. % | 6.61 | 6.84 | 5.72 | 11.52 | 11.04 | 15.92 | 20.22 | 22.80 | 22.30 |
| Feed Product Ratios | Elect. Energy (5) | 6.4 | 4.1 | 4.0 | 6.8 | 7.1 | 9.2 | 7.0 | 6.2 | 6.4 |
| | O$_2$ (6) | 6.8 | 6.7 | 8.2 | 2.0 | 2.1 | 1.9 | 1.3 | 1.2 | 1.2 |
| | Nat. Gas (7) | 8.1 | 7.9 | 9.3 | 6.7 | 7.0 | 4.3 | 3.6 | 3.2 | 3.3 |
| Nominal Cost Ratio (8) | | 8.5 | 7.2 | 8.1 | 6.8 | 7.2 | 7.0 | 5.4 | 4.8 | 5.0 |

NA—Not Applicable.
(a)—Data Not Available.
(b)—Data taken on basis of feeding device and not relatable to concentration.
(1)—lb/hr ft$^2$ with natural gas of average composition C$_{1.12}$H$_{4.21}$, average M.W. 17.63, and based on 0.0220 ft$^2$ burner cross-section.
(2)—Additive feed rate in grams/minute.
(3)—Axial inches downstream of main natural gas injection point; radial inches from burner axis.
(4)—Normalized to a basis free of argon, helium, and nitrogen, and neglecting soot formation.
(5)—kwh/lb C$_2$H$_2$ product.
(6)—lb O$_2$ feed/lb C$_2$H$_2$ product.
(7)—lb natural gas/lb C$_2$H$_2$ product.
(8)—Cents/lb C$_2$H$_2$, based on electrical energy at 0.5¢/kwh, oxygen at 0.25¢/lb, natural gas at 20¢/MCF, or 0.44¢/lb.

The foregoing detailed description has been given for clearness of understanding only, and no unnecessary limitations should be understood therefrom, as modifications will be obvious to those skilled in the art.

We claim:

1. A method for heating gases to high temperatures comprising:
   (A) flowing a first combustible mixture to a pilot burner,
   (B) igniting said first mixture at said burner to form a pilot flame in a first zone,
   (C) feeding ionizing additives to said first combustible mixture upstream of said burner,
   (D) flowing a second combustible mixture to said pilot flame and igniting said second combustible mixture,
   (E) flowing the combusting gases and the products of combustion of said two combustible mixtures into a second zone positioned downstream of said pilot flame,
   (F) maintaining an electrical discharge through said gases and said products of combustion in said second zone downstream of the pilot flame to complete combustion of said gases and increase the degree of ionization of said additives,
   (G) flowing the combustion products and the ionized additives from said second zone into a third zone, and
   (H) maintaining a uniformly distributed electrical discharge through said products of combustion in the third zone.

2. A method for heating gases as described in claim 1 in which the degree of ionization of said ionizing additives in the second zone is above 50%.

3. A method for heating gases as described in claim 1 in which said products of combustion are heated in the second zone to a temperature at which the temperature coefficient of electrical conductivity of the products of combustion is such that the electrical conductivity of the gases will not rise by more than a factor of 2 upon an increase in temperature of 1000° K.

4. A method for heating gases as described in claim 1 in which a high degree of turbulence is maintained in said second and third zone.

5. A method for heating gases as described in claim 1 in which said ionizing additives are materials having low ionizing potentials.

6. A method for heating gases as described in claim 1 in which said ionizing additives are substantially completely vaporized in said second zone.

7. A method for heating gases as described in claim 1 in which combustion of said combustible mixtures is substantially completed in said first zone downstream of said pilot flame.

8. A method for heating gases as described in claim 1 in which the supply of combustible mixtures is decreased while the supply of electrical power to said second zone is increased and non-combustible gases to be heated together with ionizing additives are supplied to said second zone.

9. A method for heating gases as described in claim 1 in which a thermally promoted chemical reaction is obtained by introducing the chemical reactants for said chemical reactions into one of said zones.

10. A method for heating gases as described in claim 1 and comprising:
   (A) passing the products of combustion through successive zones downstream of said third zone, and
   (B) maintaining a distributed electrical discharge extending through each of said zones and the gases passing through said zones.

11. A method for heating gases as described in claim 9 in which said thermally promoted chemical reaction comprises the synthesis of acetylene obtained by introducing methane into one of said zones, rapidly heating the methane to a temperature in excess of 1500° K. to form intermediate hydrocarbon products and rapidly quenching said intermediate products to form acetylene.

12. A method for heating gases as described in claim 11 in which said methane is introduced into the downstream end of said third zone.

13. A method for heating gases as described in claim 11 in which said methane is introduced into said third zone in a sheath flow injection surrounding said uniformly distributed electrical discharge therein.

14. A method for heating gases as described in claim 1 in which a portion of said second combustible mixture is introduced into said third zone in a sheath flow injection surrounding said uniformly distributed electrical discharge therein.

15. Apparatus for heating gases to high temperatures comprising:
(A) a pilot burner,
(B) means for supplying a first combustible mixture to said burner to support a pilot flame at said burner,
(C) means for supplying ionizing additives to said combustible mixture in advance of said burner,
(D) means for supplying a second combustible mixture to said pilot flame for ignition by said flame,
(E) a passageway for the flow of the products of combustion of both of said mixtures,
(F) a first electrode positioned from said pilot flame in said passageway downstream of said pilot burner,
(G) a second electrode positioned in said passageway downstream of said first electrode,
(H) means for creating an electrical discharge extending between said electrodes and passing through said products of combustion flowing through said passageway,
(I) a third electrode positioned in said passageway downstream of said second electrode, and
(J) means for creating a distributed electrical discharge through the products of combustion flowing through said passageway between said second and third electrodes.

16. Apparatus for heating gases to high temperatures as described in claim 15 and having,
(A) at least one additional electrode positioned in said passageway and spaced downstream from said third electrode, and
(B) means for creating distributed electrical discharges extending through the products of combustion in said passageway and between successive electrodes in said passageway and downstream of said third electrode.

17. Apparatus for heating gases to high temperatures as described in claim 15 in which portions of said passageway adjacent said second and third electrodes have cross-sectional areas less than the cross-sectional area of the balance of the passageway.

18. Apparatus for heating gases to high temperatures as described in claim 15 and having an inlet connected to said passage adjacent said second electrode for introducing chemical reactants into gases flowing through said passageway.

19. Apparatus for heating gases to high temperatures as described in claim 15 and having orifices in said passageway adjacent said second and third electrodes, which orifices are smaller in diameter than the portions of the passageway adjacent to said orifices.

20. Apparatus for heating gases as described in claim 15 in which said second electrode has discharge points extending into the stream of gases.

21. Apparatus for heating gases to high temperatures as described in claim 15 in which said first electrode comprises a metal tube surrounding a pilot flame supported by the burner and extending into said passageway downstream of said burner.

22. Apparatus for heating gases to high temperatures as described in claim 21 in which said tube has at least one discharge point extending downstream from the downstream end of said tube.

23. Apparatus for heating gases to high temperatures as described in claim 15, including sheath-flow outlet means connected to said passage for supplying a portion of said second combustible mixture in a sheath surrounding said distributed electrical discharge and said products of combustion flowing through said passageway between said second and third electrodes.

24. Apparatus for heating gases to high temperatures as described in claim 23 in which said sheath-flow outlet means comprises means for substantially matching the velocity of the injected portion of said second combustible mixture and the products of combustion flowing through the passageway between the second and third electrode to provide mixing between the same substantially over the length of said passageway between the second and third electrodes.

25. Apparatus for heating gases to high temperatures as described in claim 15 including means for supplying methane to said passage immediately adjacent the downstream end of said third electrode so as to heat said methane to a temperature in excess of 1500° K. to form intermediate hydrocarbon products, and quenching means for rapidly quenching said intermediate products to form acetylene.

26. Apparatus for producing electrically conducting gases comprising:
(A) a pilot burner,
(B) means for supplying a first combustible mixture to said burner to support a pilot flame at said burner,
(C) means for supplying ionizing additives to said combustible mixture in advance of said burner,
(D) means for supplying a second combustible mixture to said pilot flame for ignition by said flame,
(E) a passageway for the flow of the products of combustion of both of said mixtures,
(F) a first electrode positioned from said pilot flame in said passageway downstream of said pilot burner,
(G) a second electrode positioned in said passageway downstream of said first electrode, and
(H) means for creating an electrical discharge extending between said electrodes and passing through said products of combustion flowing through said passageway.

References Cited

UNITED STATES PATENTS

| | | | |
|---|---|---|---|
| 2,587,331 | 2/1952 | Jordan | 219—75 |
| 3,004,137 | 10/1961 | Karlovitz | 219—75 |
| 3,075,065 | 1/1963 | Ducati et al. | 313—231 X |
| 3,149,222 | 9/1964 | Giannini et al. | 219—75 X |
| 3,246,115 | 4/1966 | Johnson | 219—121 |
| 3,264,508 | 8/1966 | Lai et al. | 313—231 X |
| 3,373,306 | 3/1968 | Karlovitz | 219—75 X |
| 3,376,468 | 4/1968 | Hirt et al. | 219—75 X |

ANTHONY BARTIS, Primary Examiner

B. A. STEIN, Assistant Examiner

U.S. Cl. X.R.

219—121; 313—231